No. 628,083. Patented July 4, 1899.
H. P. EVAN.
GARMENT CUTTING SCALE.
(Application filed Aug. 29, 1898.)

(No Model.)

Witnesses:
Geo. N. Young
B. C. Roloff

Inventor
Henrietta P. Evan
By H. G. Underwood
Attorney

UNITED STATES PATENT OFFICE.

HENRIETTA PETERSON EVAN, OF WINNECONNE, WISCONSIN.

GARMENT-CUTTING SCALE.

SPECIFICATION forming part of Letters Patent No. 628,083, dated July 4, 1899.

Application filed August 29, 1898. Serial No. 689,795. (No model.)

*To all whom it may concern:*

Be it known that I, HENRIETTA PETERSON EVAN, a citizen of the United States, and a resident of Winneconne, in the county of Winnebago and State of Wisconsin, have invented certain new and useful Improvements in Garment-Cutting Scales; and I do hereby declare that the following is a full, clear, and exact description thereof.

My invention relates to that class of scales which are especially employed in the measuring and cutting of ladies' and children's garments; and it consists in certain peculiarities of measurement and proportional divisions, as will be fully set forth hereinafter and subsequently claimed.

The drawing is a representation of three of said scales, showing both sides thereof.

Referring to the drawing, each scale upon the front side (marked B) is divided into thirty-one equidistant graduations and bears a scale-number which is equal to three times the number of inches between the bottom and top graduations thereof. For example, the first scale on the left bears the number "18," and the distance between the upper and lower graduations on this scale is six inches. Similarly the next scale is numbered "21," and the extreme distance between the upper and lower graduations is seven inches, and so on. In practice the scale-numbers extend regularly from, say, "18" to "51" or more; but the three scales shown in the drawings will be sufficient for purposes of illustration. On this same B side of the scale there appears a small scale, comprising a series of dots placed one-eighth of an inch apart and consecutively numbered by numbers and half-numbers, the numeration beginning with the numeral representing one-third of the scale-number and terminating with the dot bearing the scale-number, said small scale being so placed that the graduation "17" of the main scale shall be in line with the number on the small scale representing two-thirds of the scale-number. When the scale-number is not divisible by three without remainder, then the whole number obtained by such division is taken for the number of the initial dot and the scale extended by whole and half numbers until the scale-number is reached, which is the number of the highest dot on that scale, exactly as with those scales shown in the drawing. On the reverse or A side each scale is shown similarly divided into thirty-one equidistant graduations, but (with the exception of the "18" scale) the space between each two adjacent graduations on one side of the scale is not equal to the space between each two adjacent graduations on the other side of said scale. On the B side each space or the distance between each two adjacent graduations is one-ninetieth of the length in inches indicated by the scale-number, while on the A side each specified space is one-thirtieth of an arbitrary measure obtained as the result of practice and experience from actual measurements of the human form. As a matter of fact, the distance between the lowest and highest graduations on the A side of every scale from "18" to "51," is as follows:

Scale A.

| Inches. | Inches. | Inches. |
|---|---|---|
| No. 18..6 | No. 30..$10\frac{1}{4}$ | No. 42..$12\frac{1}{16}$ |
| 19..$6\frac{5}{16}$ | 31..$10\frac{7}{16}$ | 43..$12\frac{1}{4}$ |
| 20..$6\frac{11}{16}$ | 32..$10\frac{9}{16}$ | 44..$12\frac{1}{2}$ |
| 21..$7\frac{1}{8}$ | 33..$10\frac{3}{4}$ | 45..$12\frac{11}{16}$ |
| 22..$7\frac{7}{16}$ | 34..$10\frac{7}{8}$ | 46..$12\frac{7}{8}$ |
| 23..$7\frac{7}{8}$ | 35..$11\frac{1}{8}$ | 47..$13\frac{1}{16}$ |
| 24..$8\frac{1}{4}$ | 36..$11\frac{1}{4}$ | 48..$13\frac{1}{4}$ |
| 25..$8\frac{5}{8}$ | 37..$11\frac{3}{8}$ | 49..$13\frac{5}{16}$ |
| 26..$8\frac{15}{16}$ | 38..$11\frac{1}{2}$ | 50..$13\frac{1}{2}$ |
| 27..$9\frac{5}{16}$ | 39..$11\frac{5}{8}$ | 51..$13\frac{7}{8}$ |
| 28..$9\frac{5}{8}$ | 40..$11\frac{25}{32}$ | |
| 29..$9\frac{15}{16}$ | 41..$11\frac{5}{16}$ | |

It follows from the foregoing that each space on any one of the A scales is one-ninetieth of three times the actual length in inch measurement of the space between the lowest and highest graduations on the A side of that particular scale, and hence, while for convenience I have shown thirty of these graduated spaces on each A scale, it follows that this number is arbitrary and that I may show a less number, if preferred, provided that each space is of the proper length.

A great advantage of my scales lies in the fact that the points and measurements taken therefrom may be laid out directly upon the lining of the garment itself instead of upon pattern-sheets, thus saving a great deal of time and avoiding the opportunity for error consequent upon the use of patterns, and this laying out is accomplished by the use of my said scales, in conjunction with an ordinary tailor's square, together with a suitable curved rule for the outlines of the garment. Another advantage lies in the one-eighth-inch-dot system of measurement shown on the B side of said scales, which enables the garments, including the portions set apart for seams, to be drafted directly upon the lining. When pattern-sheets are employed, these are cut apart and laid upon the fabric with their adjacent edges separated from each other a slight distance to allow for seams; but that is a matter taking a great deal of time and not altogether accurate or satisfactory, whereas with my scales everything is accurately measured, as stated, on the fabric itself and loose pattern-sheets dispensed with.

The A scales are used for the vertical measurements and the B scales for all the transverse or cross measurements of the garments. For example, if the front of a lady's waist is to be cut out the actual measurement in inches is taken with a tape-line and the vertical measurements laid out on a base-line on the garment-lining, and then with the A scale which corresponds in number with the inches of the bust measurement points are laid out on the base-line, from which points cross or transverse lines are drawn across the said lining, and then with the B scale of the same bust-measure the necessary points are marked out on said transverse lines, the base-line being further marked with necessary points of actual inch measurements for the length of the front and for the under-arm measurement, from which point similar transverse lines are drawn, on which lines points from the B scale are likewise marked, and from all these points the necessary outlines are laid out with the aid of a square and curved rule.

Relative to the small scale which appears on the margin of each scale B, it is necessary that this should be always in the same relative position in each scale, to which end the graduation "17" of the main scale B has been taken, and in line therewith should always be the location of the number on the small scale which is equal to two-thirds of the scale-number. Thus in scale B 18 its graduation "17" would be in line with dot "12" of the small scale, with scale B 21 its graduation "17" would be in line with dot "14" of the small scale, and so on, and where two-thirds of the scale-number is not a whole number then the nearest whole or half number is marked with a dot on the scale at the proper point nearest to the line of graduation "17." These small scales are used in connection with the space measurements of the B scales in laying off the waist-lines and necks of garments, and when the required graduation of the B scale is placed in line with any given point the necessary point to be laid out from the small scale shows instantly and can be taken therefrom without the need of calculation. For example, taking the scale B numbered to correspond with the bust-measure and placing its first graduation on the base-line of the back waist-lining, and with the scale extending along the waist cross-line then the dot of the number on the small scale which equals the number of inches of the waist-measure will be the line of the first point to be marked off on said waist-line from said small scale, which point marks the beginning of the second seam, and while the scale is in this position the limits of the first seam are pointed off from the appropriate graduations of the main scale B, as are the points that mark the proper limits of the center back piece. To obtain the next points on this waist-line, the said scale B is placed with its proper graduation (according to the desired width of the second seam and the piece beyond) on the point just marked, and then a point corresponding to the graduation of the scale B which indicates the other desired line of the second seam is marked off, and the same numbered dot on the small scale which just served to indicate the number of the waist-measure now serves to designate where the next point should be laid out, that point marking the limit of the back portion of the waist at the waist-line, it being understood, of course, that the lining is always doubled at the base-line before the measurements and points are laid out.

I have not deemed it necessary to minutely describe step by step all the uses of my scales in laying out garments, but only to indicate their use briefly in one or two instances, so that, as this description is addressed to those skilled in the art of dressmaking, the advantages of my novel scales might be at once apparent.

Having thus described my invention, what I claim as new, and desire to secure by Letters Patent, is—

1. A scale for drafting ladies' and children's garments having the face thereof divided by thirty-one equidistant lines of graduation, and bearing a scale-number equal to three times the number of inches of the actual length between the bottom and top lines of graduation.

2. A scale for drafting ladies' and children's garments, having the face thereof divided by thirty-one equidistant lines of graduation, and bearing a scale-number equal to three times the number of inches of the actual length between the bottom and top lines of graduation, together with a small marginal scale comprising a series of dots arranged one-eighth of an inch apart, and consecutively numbered, by numbers and half-numbers, and extending from a number practically equal to one-third of the scale-number and ending with said scale-number, and said small marginal scale being so arranged with relation to the main scale that the seventeenth line of graduation of the latter is nearest in line with the dot numbered with the whole or half number representing practically two-thirds of the scale-number.

3. A scale for drafting ladies' and children's garments, divided into thirty divisions by thirty-one graduations upon the opposite faces thereof, all the graduations on either of the faces being equidistant, but the space between each two adjacent graduations on one face differing from the space between each two adjacent graduations on the other face, and said scale bearing a scale-number equal to three times the number of inches of the length between the bottom and top graduations on the front side of the scale.

In testimony that I claim the foregoing I have hereunto set my hand, at Milwaukee, in the county of Milwaukee and State of Wisconsin, in the presence of two witnesses.

HENRIETTA PETERSON EVAN.

Witnesses:
    H. G. UNDERWOOD,
    B. C. ROLOFF.